United States Patent
Bedeschi (10) Patent No.: US 9,400,707 B2
(45) Date of Patent: Jul. 26, 2016

(54) ERROR DETECTION OR CORRECTION OF STORED SIGNALS AFTER ONE OR MORE HEAT EVENTS IN ONE OR MORE MEMORY DEVICES

(71) Applicant: MICRON TECHNOLOGY, INC., Boise, ID (US)

(72) Inventor: Ferdinando Bedeschi, Biassono (IT)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 14/616,215

(22) Filed: Feb. 6, 2015

(65) Prior Publication Data
US 2015/0154060 A1 Jun. 4, 2015

Related U.S. Application Data

(63) Continuation of application No. 13/406,962, filed on Feb. 28, 2012, now Pat. No. 8,954,824.

(51) Int. Cl.
*G11C 29/00* (2006.01)
*G06F 11/07* (2006.01)
*G06F 11/10* (2006.01)

(52) U.S. Cl.
CPC .......... *G06F 11/076* (2013.01); *G06F 11/1048* (2013.01); *G06F 11/1068* (2013.01)

(58) Field of Classification Search
None
See application file for complete search history.

(56) References Cited

U.S. PATENT DOCUMENTS

| | | | |
|---|---|---|---|
| 4,817,052 A * | 3/1989 | Shinoda | G06F 11/1008 365/104 |
| 5,787,491 A | 7/1998 | Merkin et al. | |
| 6,137,830 A | 10/2000 | Schneider et al. | |
| 7,869,269 B2 | 1/2011 | Donze et al. | |
| 8,037,380 B2 | 10/2011 | Cagno et al. | |
| 8,176,232 B2 | 5/2012 | Tedrow et al. | |
| 8,301,977 B2 | 10/2012 | Jagasivmani et al. | |
| 8,458,562 B1 | 6/2013 | Campardo et al. | |
| 8,638,602 B1 * | 1/2014 | Horn | G11C 29/021 365/185.03 |
| 2007/0277060 A1 * | 11/2007 | Cornwell | G11C 11/5628 714/54 |
| 2008/0034272 A1 | 2/2008 | Wu et al. | |
| 2009/0024905 A1 | 1/2009 | Shalvi et al. | |
| 2009/0070651 A1 * | 3/2009 | Diggs | G06F 11/1068 714/752 |
| 2009/0109738 A1 | 4/2009 | Donze et al. | |
| 2010/0211853 A1 | 8/2010 | Madan et al. | |
| 2013/0311837 A1 | 11/2013 | Bedeschi | |

OTHER PUBLICATIONS

Gallager, "Low-Density Parity-Check Codes," 1963 http://web.mit.edu/gallager/www/pages/ldpc.pdf, 90 pages.

* cited by examiner

*Primary Examiner* — Daniel McMahon
(74) *Attorney, Agent, or Firm* — Brooks, Cameron & Huebsch, PLLC (57) ABSTRACT

The present disclosure includes methods, devices, and systems for error detection or correction of stored signals in memory devices. An example method includes determining whether to perform error correction operations on contents of a non-volatile memory array. Determining whether to correct can include determining whether a level of errors in pre-programmed signals in the non-volatile memory array exceeds a bit error rate threshold, where the pre-programmed signals are different from the contents of the non-volatile memory array, and performing error correction on the contents of the non-volatile memory array if the level of errors exceeds the bit error rate threshold.

20 Claims, 6 Drawing Sheets

ERROR DETECTION OR CORRECTION OF STORED SIGNALS AFTER ONE OR MORE HEAT EVENTS IN ONE OR MORE MEMORY DEVICES

REFERENCE TO RELATED APPLICATIONS

This application is a continuation of U.S. patent application Ser. No. 13/406,962, filed Feb. 28, 2012, entitled ERROR DETECTION OR CORRECTION OF STORED SIGNALS AFTER ONE OR MORE HEAT EVENTS IN ONE OR MORE MEMORY DEVICES.

BACKGROUND

Subject matter disclosed herein may relate to memory devices, and may relate more particularly to error detection or correction of stored signals in memory devices.

Non-volatile memory devices may be found in a wide range of electronic devices. For example, non-volatile memory devices may be used in computers, digital cameras, cellular telephones, personal digital assistants, etc. Non-volatile memory devices may also be incorporated into solid state storage drives for use with computer systems or other electronic devices, for example. In many circumstances, non-volatile memory device manufacturers may pre-program signal information in non-volatile memory arrays during manufacturing. For example, non-volatile memory devices may comprise a controller to manage access operations to an array of non-volatile memory cells. Firmware comprising instructions in the form of signals executable by a controller may be pre-programmed into a non-volatile memory array during manufacturing, in at least some circumstances.

BRIEF DESCRIPTION OF THE DRAWINGS

Claimed subject matter is particularly pointed out and distinctly claimed in the concluding portion of the specification. However, both as to organization or method of operation, together with objects, features, or advantages thereof, it may best be understood by reference to the following detailed description if read with the accompanying drawings in which:

Reference is made in the following detailed description to the accompanying drawings, which form a part hereof, wherein like numerals may designate like parts throughout to indicate corresponding or analogous elements. It will be appreciated that for simplicity or clarity of illustration, elements illustrated in the figures have not necessarily been drawn to scale. For example, the dimensions of some of the elements may be exaggerated relative to other elements for clarity. Further, it is to be understood that other embodiments may be utilized. Furthermore, structural or logical changes may be made without departing from claimed subject matter.

It should also be noted that directions or references, for example, up, down, top, bottom, and so on, may be used to facilitate discussion of the drawings and are not intended to restrict application of claimed subject matter. Therefore, the following detailed description is not to be taken to limit claimed subject matter or equivalents thereof.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

As mentioned above, non-volatile memory devices may be found in a wide range of electronic devices. For example, non-volatile memory devices may be used in computers, digital cameras, cellular telephones, personal digital assistants, etc. Non-volatile memory devices may also be incorporated into solid state storage drives for use with computer systems or other electronic devices, for example. In many circumstances, non-volatile memory device manufacturers may pre-program information in non-volatile memory arrays during manufacturing. For example, non-volatile memory devices may comprise a controller to manage access operations to an array of non-volatile memory cells. Firmware comprising instructions executable by a controller may be pre-programmed into a non-volatile memory array during manufacturing, in at least some circumstances. Non-volatile memory devices may implement functions ranging from simple to complex by use of a controller. For one or more embodiments, a controller may comprise a microcontroller. A potential advantage of utilizing a microcontroller and associated firmware code may comprise relatively easy changes or fine tuning of memory device behavior. For example, new functions may be added to a non-volatile memory device's capabilities by altering firmware code. In some cases, time and expense of a memory device redesign may be avoided through alteration of firmware code.

An example type of non-volatile memory device may comprise a phase change memory (PCM) device, for an example embodiment. Phase change memory devices may be characterized at least in part by how information is stored in individual memory cells in that a state of a particular memory cell may depend at least in part on a state of memory cell material.

In an embodiment, a PCM memory cell may be made to switch between different states with an application of sufficient heat. For example, a "set" state, representing a binary value of "1", in an embodiment, may correspond to a substantially crystalline, substantially conductive state for a material of a memory cell. A "reset" state, on the other hand, representing a binary value of "0", in an embodiment, may correspond to a substantially amorphous, relatively resistive state of a memory cell. In a PCM memory, heat sufficient to change a phase of a memory cell may be achieved by application of a current pulse to the memory cell, in an embodiment. Characteristics of an applied current pulse, and therefore characteristics of applied heat, may determine which particular state is reflected in a memory cell. As used herein, "substantially amorphous state" refers to a state of memory cell material characterized at least in part by relatively high resistivity. Also as used herein, "substantially crystalline state" refers to a state of memory cell material characterized at least in part by relatively high conductivity. In an embodiment, a level of conductivity of a memory cell in a substantially crystalline state may be at least an order of magnitude greater than a level of conductivity of a memory cell in a substantially amorphous state. However, claimed subject matter is not limited in scope in this respect. A PCM memory cell may comprise chalcogenide glass, in an embodiment, although again, claimed subject matter is not limited in scope in this manner.

For a PCM memory device, due at least in part to factors explained above, information stored in PCM memory cells may not be reliably retained if cells are exposed to types of thermal cycles, also referred to herein as heat events, that may occur in packaging or soldering PCM memory devices during device or system manufacturing. Because PCM cells may change state, for example from a crystalline state to an amorphous state, with an application of sufficient heat, information pre-programmed into a PCM array may have one or more errors induced therein. At least in part as a result of experiencing a heat event, a PCM memory array may experience bit-error rate (BER) levels that are more elevated than specified or desired for a particular application, in some cases.

Example embodiments described herein may provide techniques for performing error detection or correction on contents of at least a portion of a non-volatile memory array of a memory device at least in part in response to one or more signals indicative that a risk of signal corruption is present due at least in part to occurrence of one or more heat events. As used herein, a "heat event" may refer to any application of heat to a memory device, wherein a magnitude of heat applied may subject a memory device to signal corruption for a given application. As described above, example heat events may occur during a manufacturing process, for example during packaging operations or during soldering, to name but two examples. In an example embodiment, at some point in time following a heat event, a determination may be made within a memory device whether the memory device may have been exposed to a heat event. In an embodiment, a determination may comprise determining a likelihood of a temperature applied to a memory array subjecting a memory device to a risk of stored signal information corruption. Claimed subject matter is not limited in scope to any particular technique for making a determination with respect to a heat event. Example techniques for checking for a heat event are described below. Also in an embodiment, signals indicative that the risk of signal corruption is present may comprise one or more environmental signals, array error signals, or power signals. An environmental signal may comprise a temperature signal, for example. A power signal may comprise a signal indicative of a power-on event, for another example. Of course, these are merely examples of environmental, array error, or power signals, and claimed subject matter is not limited in scope in these respect.

Also in an embodiment, at least in part in response to a determination that a heat event may have occurred with respect to a memory array, a memory device may read information from a potentially affected memory array. Error detection or correction operations may be performed over a portion or all of a memory array, and corrected information may be re-programmed into a memory array to restore all or a portion of the memory array to a state that existed prior to the suspected or detected heat event. For example embodiments, claimed subject matter is not limited in scope to any particular error detection or correction techniques. Any technique or combination of techniques, whether currently existing or to be created in the future, may be utilized to detect or correct errors in information stored in a memory array. By detecting a likelihood of a heat event, or by detecting or correcting errors in information stored in a memory array resulting from a suspected or detected heat event, integrity of information programmed into a non-volatile memory array may be maintained, even in an environment where a heat event may occur.

Figure 1:
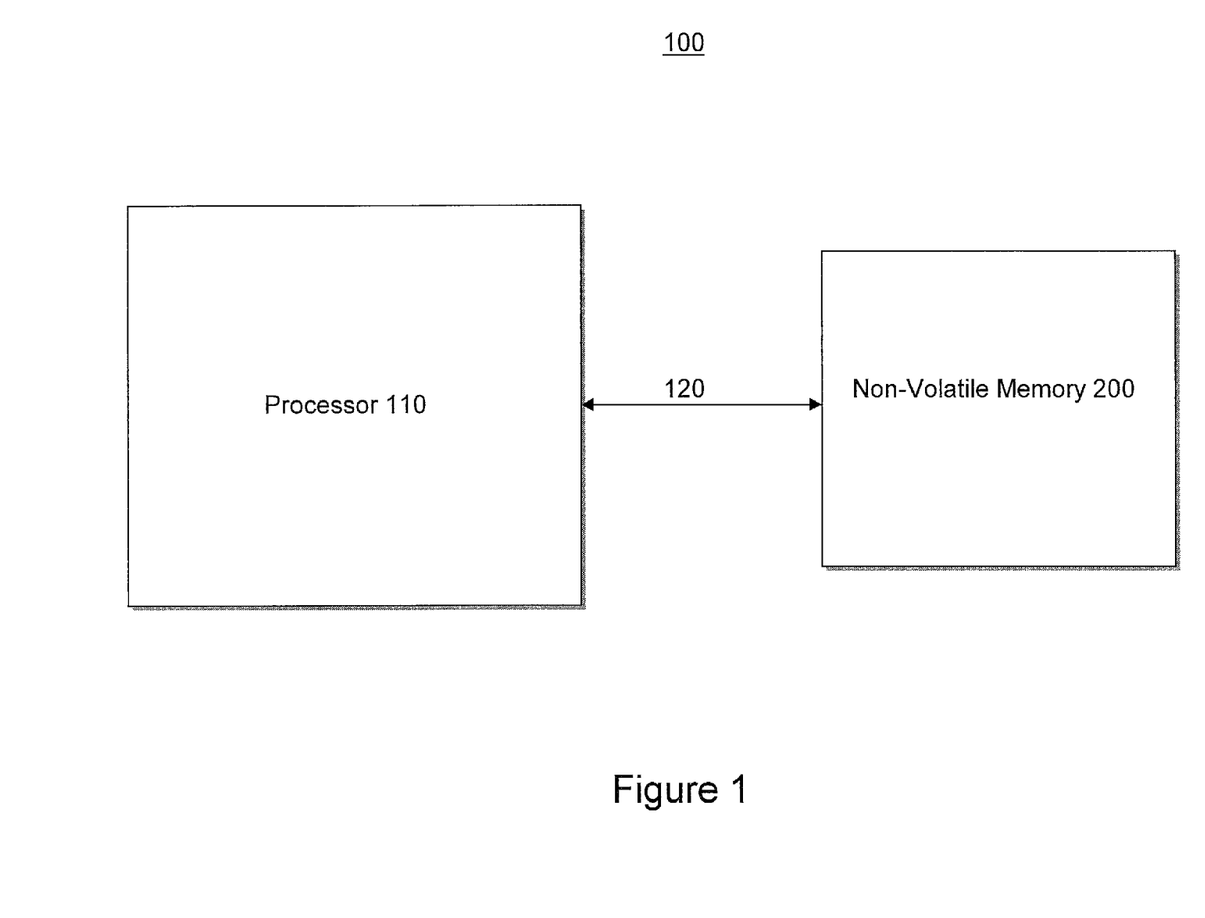
FIG. 1 is a schematic block diagram illustrating an example embodiment of a computing platform.

FIG. 1 is a block diagram of an example embodiment of a computing platform 100, comprising a processor 110 and a non-volatile memory 200. For an example embodiment, non-volatile memory device 200 may comprise a PCM memory device, although claimed subject matter is not limited in scope in this respect. In an embodiment, memory 200 may comprise any memory technology currently existing or yet to be developed wherein a physical property of a cell may change at least in part in response to application of sufficient heat. Memory 200 for an example embodiment may be coupled to processor 110 by way of a parallel interconnect 120, although again, claimed subject matter is not limited in scope in this respect. Also for an embodiment, processor 110 may fetch executable instructions stored in an array of PCM memory cells in memory 200, and processor 110 may execute fetched instructions. Other information may also be written to and/or read from memory 200 by processor 110. A controller within non-volatile memory 200 executing firmware instructions stored within non-volatile memory 200 may be utilized to implement read or write accesses, in accordance with one or more command codes received from processor 110. For an example embodiment, a configuration of computing platform 100 may comprise an execute-in-place (XiP) implementation, wherein processor 110 may fetch instructions directly from long-term memory, comprising non-volatile memory device 200 for this example. An example of a non-XiP implementation may comprise a processor fetching temporarily stored instructions from a volatile memory device, as a dynamic random access memory (DRAM).

As used herein, "computing platform" refers to a system or a device that may include an ability to process or store information signals. A computing platform, in this context, may comprise hardware, software, firmware or any combination thereof. Computing platform 100, as depicted in FIG. 1, is merely one example, and claimed subject matter is not limited in scope in these respects. For one or more embodiments, a computing platform may comprise any of a wide range of digital electronic devices, including, but not limited to, personal desktop or notebook computers, high-definition televisions, digital versatile disc (DVD) players or recorders, game consoles, satellite television receivers, cellular telephones, personal digital assistants, mobile audio or video playback or recording devices, and so on. Further, unless specifically stated otherwise, a process as described herein, with reference to flow diagrams or otherwise, may also be executed or controlled, in whole or in part, by a computing platform. For the example embodiments described herein, computing platform 100 may comprise a cellular telephone, although again, the scope of claimed subject matter is not so limited.

Figure 2:
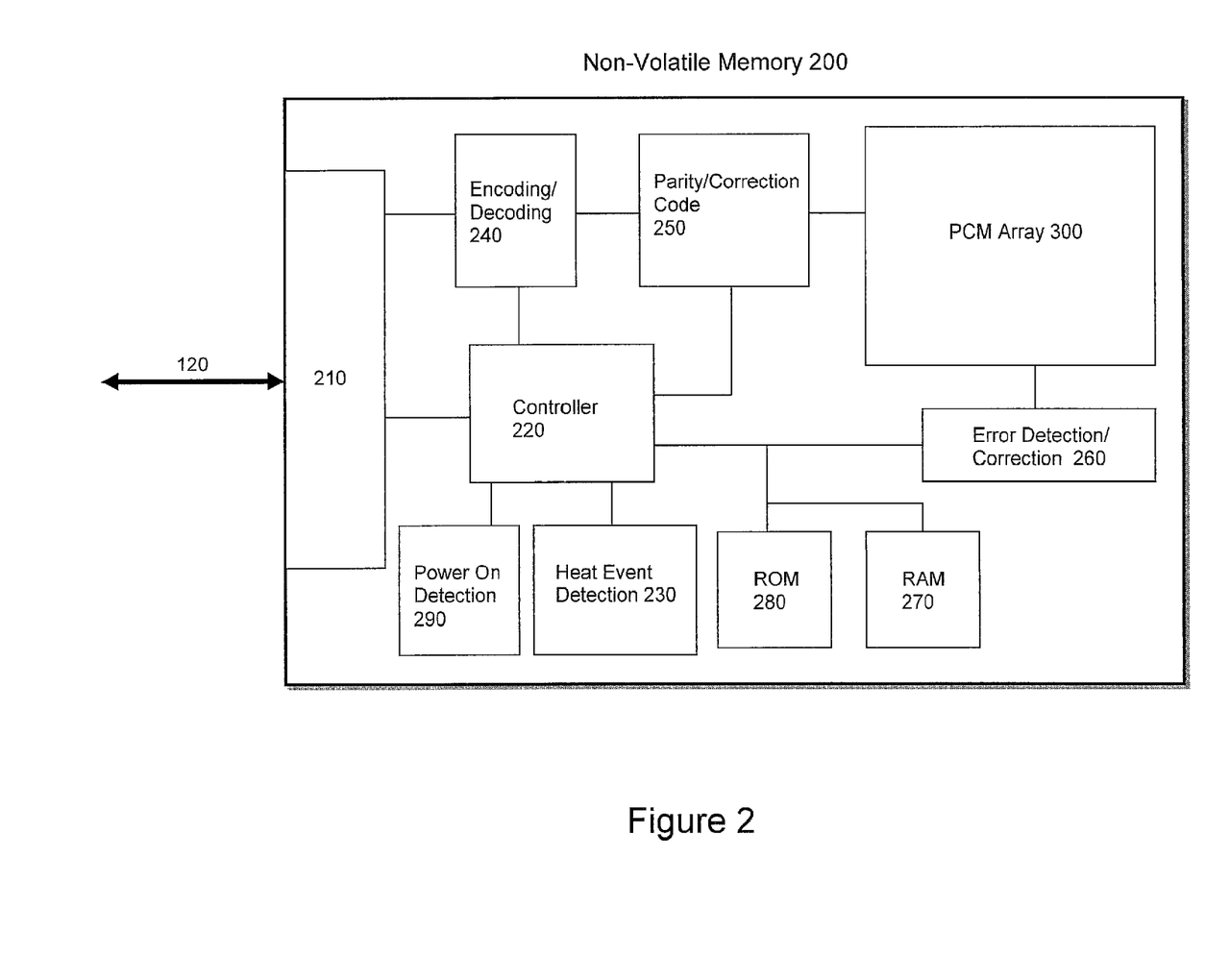
FIG. 2 is a schematic block diagram depicting an example embodiment of a non-volatile memory device.

FIG. 2 is a schematic block diagram depicting an example embodiment of non-volatile memory device 200 including an interconnect interface 210 to receive one or more control signals or command codes from processor 110, for an example. Memory device 200 may also transmit or receive address or other information via interconnect interface 210. For one or more embodiments, a controller 220 may receive one or more control signals or command codes from processor 110 via interconnect 120 and interface 210, and may generate one or more internal control signals to perform any of a number of operations, including read or write operations, by which processor 110 may access PCM array 300, for example. As used herein, "controller" refers to any circuitry or logic involved in management or execution of command sequences as they relate to volatile or non-volatile memory devices. "Controller" further refers to an ability to execute firmware instructions as part of the management or execution of command sequences, in an embodiment.

In an embodiment, information to be stored in PCM array 300 may arrive at memory device 200 at interface 210, and may be transmitted to an encoding/decoding component 240. Encoding/decoding component 240 may employ any encoding or decoding techniques on or applied to signals to be stored in PCM array 300. In an embodiment, information may be encoded to change a ratio of binary "0" values to binary "1" values in code signals to be stored in array 300. For example, as previously mentioned, a heat event may result in a memory cell previously having a substantially crystalline state, representing a binary value of "1", resetting to a substantially amorphous state, representing a binary value of "0". By increasing an amount of binary "0" values in code signals to be stored in array 300, signal information corruption errors resulting at least in part from heat events may be reduced. Of course, claimed subject matter is not limited in these respects. Encoding/decoding component 240 may also compress signal information to be stored in PCM array 300 in some embodiments to clear or increase space within PCM array 300 for use by extra signal bits that may be used for error detection or correction. Again, claimed subject matter is not limited in scope in these respects.

Memory device 200 may further comprise a parity/correction code component 250 that may, in an embodiment, generate error detection or correction codes to be associated with signal to be stored in PCM array 300. Embodiments in accordance with claimed subject matter may employ any techniques for error detection or correction, and accordingly, parity/correction code component 250 may generate error detection or correction codes or parity bits appropriate for any technique. Example types of error detection or correction techniques that may be employed may include low density parity-check (LDPC) coding techniques and BCH coding techniques (named after inventors Bose, Ray-Chaudhuri, and Hocquenghem), such as, for example, Reed-Solomon coding techniques. However, claimed subject matter is not limited in scope in these respects.

In a further aspect, a combination of code types or coding processes may be utilized. Combining of coding processes in this manner may be referred to as code concatenation, in an embodiment. For example, a soft-decision coding technique such as LDPC may be combined with a hard-decision coding technique such as Reed Solomon to form a concatenated code type. Of course, this is merely one example concatenated coding technique, and claimed subject matter is not limited in scope in this respect. As used herein, "hard-decision" coding techniques refer to coding techniques whereby a determination may be made for individual input and output signal bits as to whether the individual signal bits correspond to a binary value of "1" or a binary value of "0". Also as used herein, "soft-decision" coding techniques may utilize estimates, based at least in part on probabilities, of received signal symbols as inputs. Further, as used herein, "concatenated code" refers to code generated using a combination of coding techniques. In an example embodiment, as mentioned above, a concatenated code may comprise code generated using a combination of soft-decision and hard-decision coding techniques. Of course, claimed subject matter is not limited in scope in these respects.

As previously mentioned, a heat event may result in one or more cells within array 300 changing state from a binary signal value "1" to a binary signal value "0". For a cell with a previously substantially crystalline structure yielding relatively highly conductive states signifying binary signal values of "1", a melting of cell material may substantially destroy crystalline structures to yield a substantially amorphous structure. As previously mentioned, in an embodiment a substantially amorphous state of a PCM memory cell may signify a binary signal value of "0". In this manner, binary signal values of "1" may become binary signal values of "0" in a spurious and haphazard fashion, potentially introducing errors into signals stored within a phase-change memory array, such as PCM array 300.

Non-volatile memory 200 in an embodiment may further comprise a heat event detection component 230 and a power-on detection component 290. Of course, it is understand that a component may be implemented as a general purpose processor or similar device operating in accordance with special purpose programming or instructions. Thus, for example, in an embodiment, separate components may be implemented as portions of a set of special purpose instructions or special purpose programming. For example, component 230 may, in an embodiment, include special purpose instructions to detect a heat event or process a detected heat event. In an embodiment, to detect a heat event may comprise measurement of a temperature in a vicinity of a memory array. Further, in an embodiment, a heat event may be detected if a measured temperature exceeds a specified threshold, indicating that an application of heat potentially sufficient to introduce one or more errors has occurred. Although example techniques are disclosed herein, claimed subject matter is not limited in scope to any particular technique for detecting a heat event. Also, although heat event detection component 230 is depicted in FIG. 2 as being separate from controller 220, other embodiments in accordance with claimed subject matter may implement heat event detection operations utilizing controller 220.

Component 230 may signal to controller 220 to perform error detection or correction operations on contents of PCM array 300 at least in part in response to a detection of a heat event. An error detection/correction component 260 may perform error detection or correction operations utilizing one or more error detection or correction techniques described above. For example, error detection or correction component 260 may apply decoding or error detection or correction techniques appropriate for concatenated LDPC/BCH encoding at least in part in response to fetching information from PCM array 300. However, as previously mentioned, claimed subject matter is not limited in scope to any particular technique for detecting or correcting errors. In an additional embodiment, corrected contents of PCM array 300 may at least in part in response to a completion of error detection or correction operations be re-programmed into PCM array 300. In this manner, contents of PCM 300 may be restored to a state prior to a detected heat event.

In an additional embodiment, power-on detection component 290 may detect a power-on event for memory device 200. At least in part in response to a detection of a power-on event, component 290 may, for an embodiment, assume that a heat event occurred prior to power-on, and error detection or correction operations may be initiated. In this manner, heat events associated with device or system manufacture may be accounted for or corrected for in response to a detection of a power-on event. In an embodiment, a detection of a power-on event may occur at least in part in response to a first power-on in order to detect or correct errors that may be introduced during manufacturing. In other embodiments, detection of a power-on event may occur more than once, and may, in an embodiment, occur at least in part in response to applications of power to memory 200. Although power-on detection component 290 is depicted in FIG. 2 as being separate from controller 220, other example embodiments in accordance with claimed subject matter may implement power-on detection operations in controller 220.

In a further embodiment, rather than assuming a heat event prior to a power-on event, heat event detection component 230 may detect a likelihood of a heat event sufficient to potentially risk corruption of a stored signal at least in part by analyzing at least a portion of contents of PCM array 300. In an example embodiment, a pre-selected, or known, signal pattern 350 may be stored in a portion of PCM array 300. In an embodiment, known pattern 350 may be stored in array 300 during a manufacturing process. In another embodiment, known pattern 350 may be stored in array 300 at a point in time following a manufacturing process. In some embodiments, known signal pattern 350 may include at least some binary signal bit values of "1". However, claimed subject matter is not limited in scope to any particular time period for programming a known signal pattern in memory array 300, and is also not limited to any particular known signal pattern. Component 230 may read previously stored signal pattern 350 from array 300, and may perform error detection operations to determine an amount of errors. If no errors are detected, component 230 may determine that no heat event occurred, and no further error detection or correction operations may be undertaken to correct for heat event, unless a subsequent heat event is detected. In an embodiment, a bit error rate (BER) threshold may be specified. At least in part in response to reading known pattern 350 from array 300, a measured, sampled, or estimated BER below specified threshold may indicate no heat event, while a BER measured, sampled, or estimated to be at or above threshold may indicate an occurrence of a heat event. As indicated previously, a detection of a heat event may trigger a response by error detection/correction component 260 to detect or correct errors within at least a portion of PCM array 300, and to re-program corrected information back into array 300.

Non-volatile memory 200 for an embodiment may also comprise a read-only memory array (ROM) 280 and a random access memory array (RAM) 270. In an embodiment, ROM 280 store firmware executable by controller 220. In a further embodiment, RAM 270 may store decoded or de-compressed information that may be more quickly accessed, as compared to encoded or compressed information stored within PCM array 300. In an embodiment, information previously stored in array 300 may be error detected or corrected or decompressed by component 260, and corrected information may be stored in RAM 270 for relatively quick retrieval by controller 220. Although memory 200 has been described as having a specific arrangement or configuration of components or functional units, claimed subject matter is not limited in scope in these respects.

Figure 3:
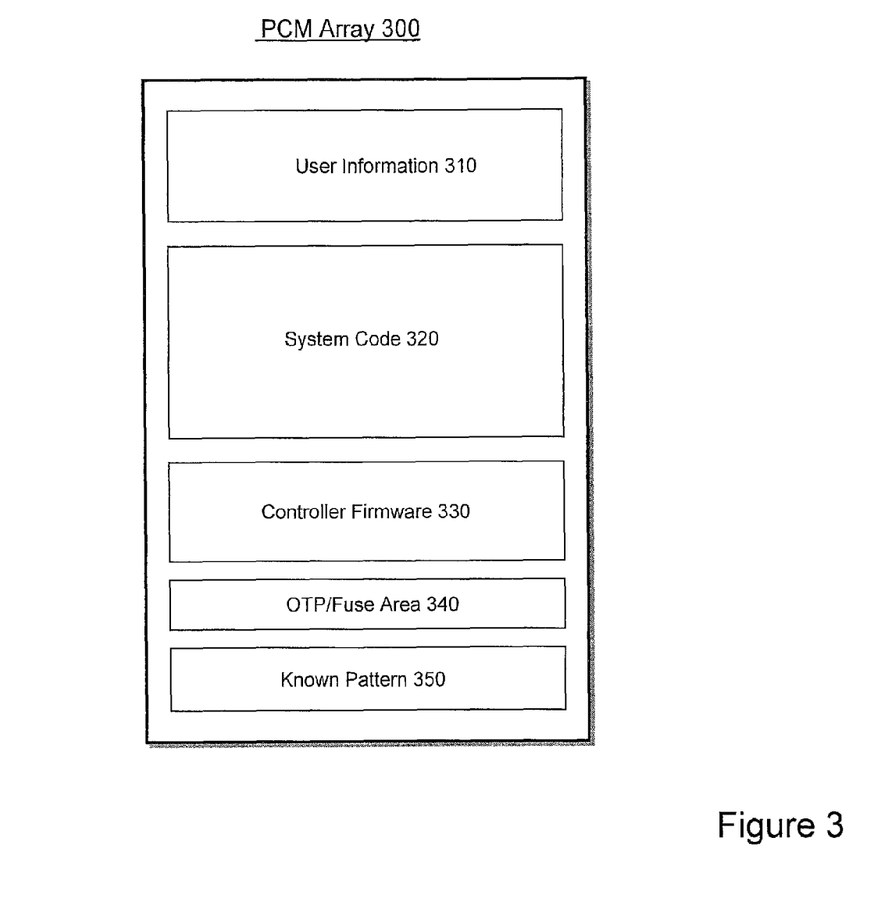
FIG. 3 is block diagram depicting an example embodiment of a non-volatile memory array.

FIG. 3 is block diagram depicting an example embodiment of non-volatile memory array 300. For the example of FIG. 3, non-volatile array 300 may comprise a PCM memory array, as previously discussed. FIG. 3 depicts several example types of information that may be stored in PCM array 300, in an embodiment. For example, array 300 may store user information 310, and system code 320. In an embodiment, system code 320 may comprise software or firmware instructions executable by processor 110, although claimed subject matter is not limited in scope in this respect. PCM array 300 may further store controller firmware 330, in an embodiment. Firmware 330 may comprise instructions executable by controller 220 in carrying out memory array access commands received at interface 210 from processor 110. Further, in an embodiment, PCM array 300 may comprise a one-time-programmable (OTP)/fuse area 340, and a known pattern 350 may also be stored at PCM array 300. Of course, the example configuration of memory spaces and information types depicted in FIG. 3 is merely an example, and the scope of claimed subject matter is not limited in these respects.

Figure 4:
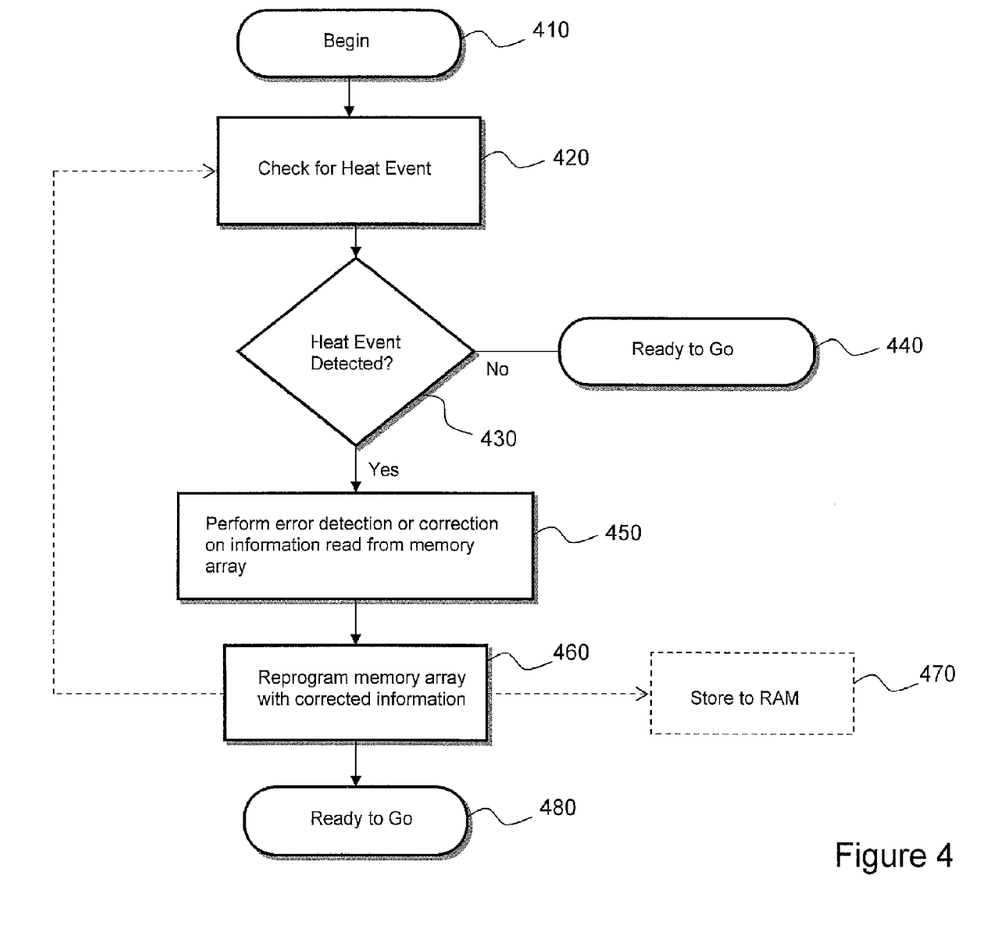
FIG. 4 is a flow diagram of an example embodiment of a process to detect or correct errors in a non-volatile memory array following one or more heat events.

FIG. 4 is a flow diagram of an example embodiment of a process to detect or correct errors in a non-volatile memory array at least in part in response to a detection of a heat event for the memory array. For the example depicted in FIG. 4, an example begins at block 410. Block 420 indicates a check for a heat event may be performed. As indicated above, an example heat event may comprise a packaging or soldering operation performed as part of a manufacturing flow for a memory device or for a larger electronic system or device. An application of heat as one might expect during a soldering operation, for example, to a PCM memory device may be sufficient to melt cell material within a memory array, thereby potentially altering a state of one or more memory cells.

At block 430, a determination may be made as to whether a heat event has been detected. If not, contents of PCM memory array are deemed "ready to go", or substantially error free. However, if at block 430 a heat event is determined to have occurred, error detection or correction operations may be performed on information read from PCM memory array, as indicated at block 450. As indicated above, any techniques for detecting or correcting errors in a memory array may be utilized in embodiments in accordance with claimed subject matter. In an embodiment, a memory array may be re-programmed with corrected information, as indicated at block 460, and contents of memory array are ready to go, as noted at block 480. As further indicated at block 470, corrected information may also be programmed into a random access memory (RAM) array. In an embodiment, information stored in RAM may be stored in an already-decoded state to enable relatively quick reads from RAM.

In an embodiment, detection of a heat event and subsequent detection or correction of errors within a memory array may occur one time in response to a an initial power-up following a manufacturing process. However, in an additional embodiment, at least in part in response to a memory array being re-programmed with corrected information as indicated at block 460, an example technique may perform additional checks for subsequent heat events. In this manner, a memory device may receive continuing protection against an introduction of heat-induced errors.

Figure 5:
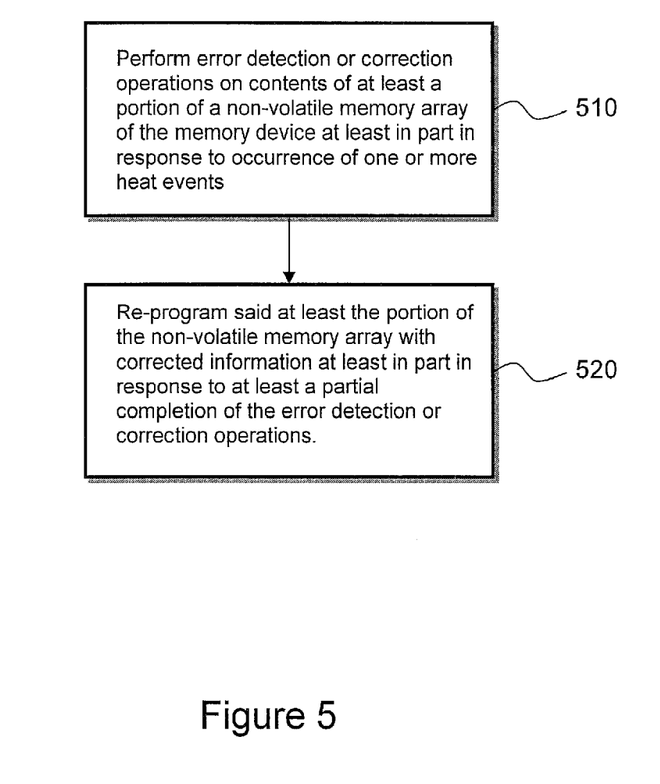
FIG. 5 is a flow diagram of an example embodiment of a process to detect or correct errors in a non-volatile memory array following one or more heat events.

FIG. 5 is a flow diagram of an example embodiment of a process to detect or correct errors in a non-volatile memory array following a heat event. An example process depicted in FIG. 5 may be viewed as a summary of much of the preceding discussion. However, claimed subject matter may comprise all, less than, or more than blocks 510-520 described in connection with the example of FIG. 5. Additionally, the order of blocks 510-520 is merely an example order, and the scope of claimed subject matter is not limited in this respect. At block 510, error detection or correction operations may be performed on contents of at least a portion of a non-volatile memory array of a memory device at least in part in response to one or more signals indicative that a risk of signal corruption is present due at least in part to occurrence of one or more heat events. A heat event may comprise a soldering operation during manufacturing, for example, although claimed subject matter is not limited in this respect. In an example embodiment, the one or more signals indicative that the risk of signal corruption is present may comprise one or more environmental signals, array error signals, or power signals. At block 520, at least the portion of the non-volatile memory device may be re-programmed with corrected information at least in part in response to at least a partial completion of the error detection or correction operations. As previously mentioned, claimed subject matter is not limited in scope with respect to particular error detection or correction techniques.

Figure 6:
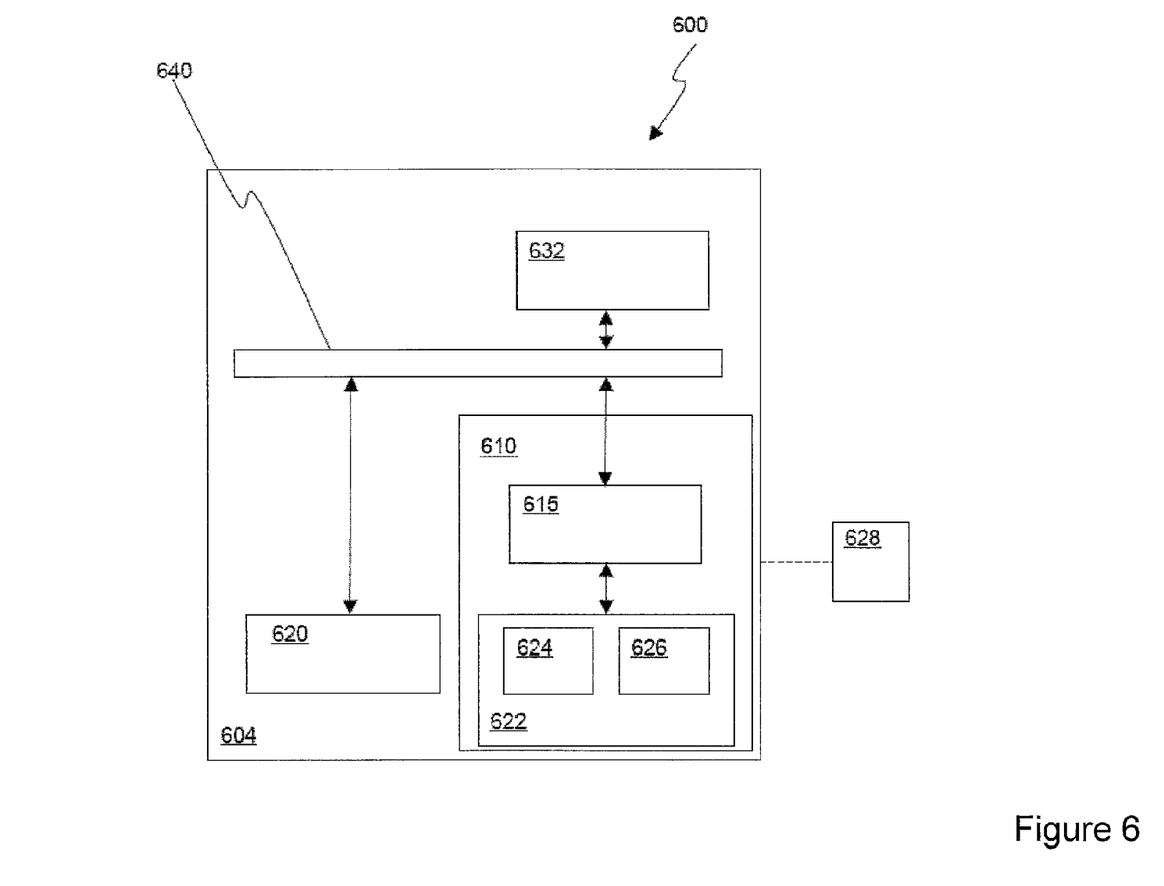
FIG. 6 is a schematic block diagram illustrating an example embodiment of a computing platform.

FIG. 6 is a schematic block diagram illustrating an example embodiment of a computing platform including a memory device 610. A computing device may comprise one or more processors, for example, to execute an application and/or other code. For example, memory device 610 may comprise a PCM memory device, such as that depicted in FIG. 1. A computing device 604 may be representative of any device, appliance, or machine that may be configurable to manage memory device 610. Memory device 610 may include a memory controller 615 and a memory 622. By way of example but not limitation, computing device 604 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or information storage service provider/system; and/or any combination thereof.

It is recognized that all or part of the various devices shown in system 600, and the processes and methods as further described herein, may be implemented using or otherwise including hardware, firmware, software, or any combination thereof. Thus, by way of example but not limitation, computing device 604 may include at least one processing component 620 that is operatively coupled to memory 622 through a bus 640 and a host or memory controller 615. Processing component 620 is representative of one or more circuits configurable to perform at least a portion of an information computing procedure or process. By way of example but not limitation, processing component 620 may include one or more processors, controllers, microprocessors, microcontrollers, application specific integrated circuits, digital signal processors, programmable logic devices, field programmable gate arrays, and the like, or any combination thereof. Processing component 620 may include an operating system configured to communicate with memory controller 615. An operating system may, for example, generate commands to be sent to memory controller 615 over bus 640. In one implementation, memory controller 615 may comprise an internal memory controller or an internal write state machine, wherein an external memory controller (not shown) may be external to memory device 610 and may act as an interface between the system processor and the memory itself, for example. Memory 622 is representative of any information storage mechanism. Memory 622 may include, for example, a primary memory 624 and/or a secondary memory 626. Memory 622 may comprise a PCM array, for example. While illustrated in this example as being separate from processing component 620, it should be understood that all or part of primary memory 624 may be provided within or otherwise co-located/coupled with processing component 620.

Memory device 610 may include, for example, components or functional units similar to those described above in connection with memory device 200, wherein components or functional units are provided to perform coding/decoding, compression/decompression, and error detection or correction functions on information to be stored in PCM memory array 622. Additionally, heat events may be detected at least in part by analyzing a known pattern stored within memory array 622, in an embodiment. Heat event detection, error detection or correction, and PCM array re-programming operations in accordance with example embodiment described above in connection with FIGS. 1-5 may further be implemented in memory 610.

Secondary memory 626 may include, for example, the same or similar type of memory as primary memory and/or one or more information storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 628 may include, for example, any medium that can carry and/or make accessible information, code, and/or instructions for one or more of the devices in system 600.

Computing device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," and "or" as used herein may include a variety of meanings that also is expected to depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description included herein are presented in terms of processes or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Process descriptions or symbolic representations are examples of techniques used by those of ordinary skill in the signal processing or related arts to convey the substance of their work to others skilled in the art. An process is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

What is claimed is:

1. A method, comprising:
   determining whether to perform error correction operations on contents of a non-volatile memory array, wherein determining whether to correct comprises:
   determining whether a level of errors in pre-programmed signals in the non-volatile memory array exceeds a bit error rate threshold, wherein the pre-programmed signals are different from the contents of the non-volatile memory array; and
   performing error correction on the contents of the non-volatile memory array if the level of errors exceeds the bit error rate threshold.

2. The method of claim 1, wherein the non-volatile memory array is part of a memory device, wherein the pre-programmed signals are programmed into the non-volatile memory array during manufacture of the memory device.

3. The method of claim 2, wherein the determining whether to perform the error correction operations is performed one time in response to an initial power-up following the manufacture of the memory device.

4. The method of claim 3, further comprising subjecting the non-volatile memory array to a heat event sufficient to change a state of the memory cells during the manufacture of the memory device.

5. The method of claim 4, wherein subjecting the non-volatile memory array to the heat event comprises performing a soldering operation.

6. The method of claim 1, wherein the contents of the non-volatile memory array comprises system code.

7. The method of claim 6, wherein system code comprises firmware.

8. The method of claim 7, wherein the firmware comprises instructions for a controller of the memory device.

9. The method of claim 1, wherein the pre-programmed signals and the contents of the non-volatile memory array are stored in different portions of the non-volatile memory array.

10. The method of claim 1, wherein the non-volatile memory array is a phase change memory array.

11. The method of claim 10, wherein at least some of the pre-programmed signals correspond to crystalline memory cell states.

12. The method of claim 1, further comprising encoding information for storage in the non-volatile memory array, wherein encoding information comprises increasing an amount of binary "0" values in code signals representing the encoded information.

13. A memory device, comprising:
   a non-volatile memory array; and
   a heat event detection component configured to:
   determine whether a level of errors in pre-programmed signals in the non-volatile memory array exceeds a bit error rate threshold; and
   provide a signal indicative of occurrence of a heat event, thereby causing error correction operations to be performed on at least some portions of the non-volatile memory array at locations different from locations for storing the pre-programmed signals.

14. The non-volatile memory device of claim 13, wherein the pre-programmed signals comprise signals programmed into the non-volatile memory array during manufacture of the memory device,
   wherein the heat event detection component is configured to determine, one time in response to an initial power-up following the manufacture of the memory device, whether a level of errors in the pre-programmed signals in the non-volatile memory array exceeds a bit error rate threshold.

15. The non-volatile memory device of claim 13, wherein the heat event detection component is configured to measure a temperature in a vicinity of the non-volatile memory array.

16. The non-volatile memory device of claim 13, further comprising a controller, wherein the at least some portions of the non-volatile memory array store firmware instructions for the controller.

17. A system, comprising:
    a processor; and
    a memory device coupled to the processor, the memory device comprising:
        a non-volatile memory array; and
        a heat event detection component configured to:
            determine whether a level of errors in pre-programmed signals in the non-volatile memory array exceeds a bit error rate threshold; and
            provide a signal indicative of occurrence of a heat event, thereby causing error correction operations to be performed on at least some portions of the non-volatile memory array at locations different from locations for storing the pre-programmed signals.

18. The system of claim 17, wherein the at least some portions of the non-volatile memory array store system code.

19. The system of claim 18, wherein the system code comprises firmware.

20. The system of claim 17, wherein the non-volatile memory array comprises phase change memory cells.

* * * * *